May 11, 1954
C. N. REUTER
2,678,210
BUMPER ASSEMBLY
Filed March 20, 1950
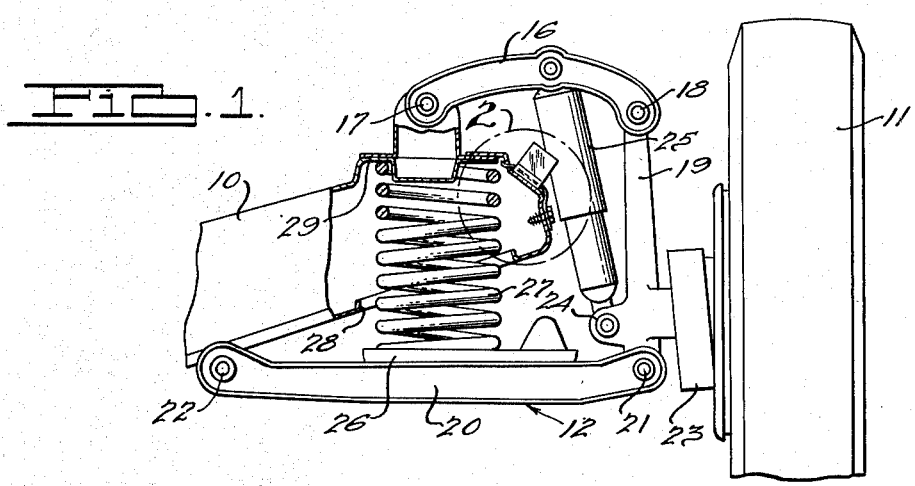
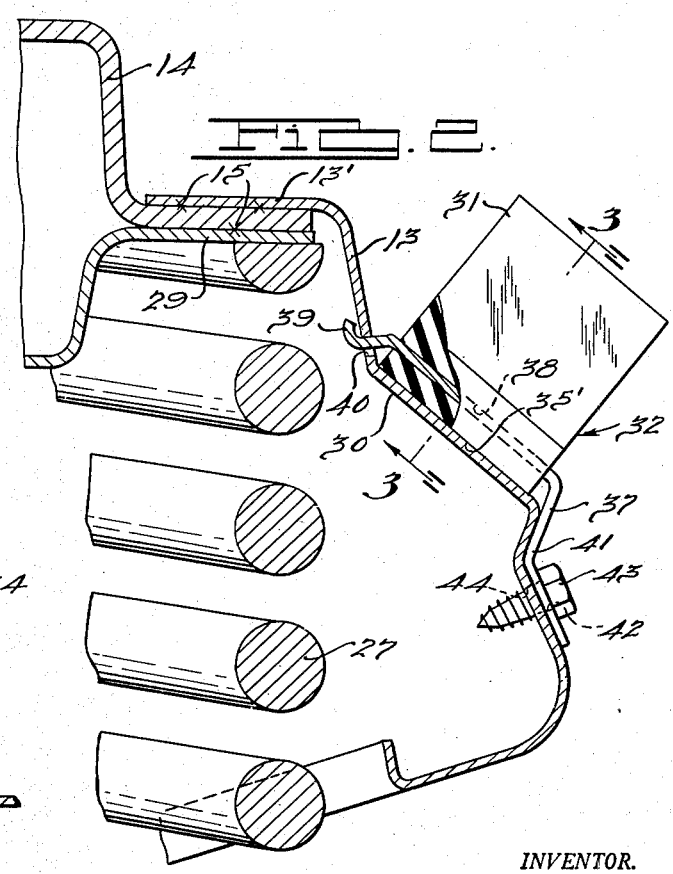
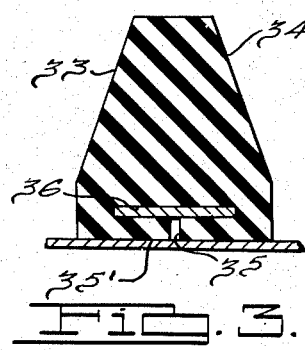
INVENTOR.
Conrad N. Reuter.
BY
Harness and Harris
ATTORNEYS.

Patented May 11, 1954

2,678,210

UNITED STATES PATENT OFFICE 2,678,210

BUMPER ASSEMBLY

Conrad N. Reuter, Detroit, Mich., assignor to Chrysler Corporation, Highland Park, Mich., a corporation of Delaware Application March 20, 1950, Serial No. 150,706

7 Claims. (Cl. 267—63)

My invention relates to vehicle wheel suspension systems.

More particularly my invention relates to an improved assembly of a yieldable bumper, its retaining means and a vehicle suspension system.

An object of my invention is to provide a vehicle suspension with an improved bumper and assembly which is easily applied and comprises a minimum number of parts.

Another object of my invention is to provide an improved bumper and bumper strap assembly which is not only economical but easily manufactured.

Other objects and advantages will become more apparent from the following description of one embodiment of my invention, reference being had to the accompanying drawings in which:

Fig. 1 is a front elevational view of a vehicle suspension system embodying my invention.

Fig. 2 is an enlarged sectional view of the structure within the circle 2 of Fig. 1.

Fig. 3 is a transverse sectional view taken on the line 3—3 of Fig. 2.

In the drawings I have shown a portion of a motor vehicle frame structure including a cross member 10, a wheel 11 and a suspension system, generally designated by the numeral 12, disposed therebetween. The cross member 10 is secured to a partially curved portion 13 of a side rail, the remaining portions of which are not shown. The curved portion 13 of the side rail is provided with a substantially horizontal portion 13' which is welded or in some other similar fashion secured to a hat member 14 and to a partially raised end portion 29 of the cross member 10, as at 15. The suspension system 12 includes an upper control arm 16 which has one end pivotally mounted on the hat portion 14 by the pin 17 while its other end is pivotally secured by pin 18 to the upper end of an upright knuckle bracket 19. The lower end of the upright knuckle bracket is pivotally connected to one end of a lower control arm 20 by pin 21, the other end of the arm 20 being pivotally secured by pin 22 to the cross member 10 at a location inwardly of the vehicle from the pivotal connection of the upper control arm thereto. The upright knuckle bracket is connected through a king pin assembly 23 to the wheel 11. The upright knuckle bracket is provided with an inwardly extending projection 24 which pivotally receives the lower end of a conventional tubular hydraulic shock absorber 25. The upper end of the shock absorber is pivotally connected to the upper control arm 16 at a location substantially equidistant from its opposite ends. The lower control arm 20 is provided with a plate 26 mounted across its upper portion for supporting the lower end of a coil spring 27. The coil spring 27 extends through an opening 28 in the lower portion of the cross member 10 and is seated against the underside of the partially raised end portion 29 of the cross member 10.

The curved portion 13 of the side rail is provided with a substantially flat section 30 which engages a bumper 31 of a bumper assembly, generally designated by the numeral 32. The bumper 31 is of a conventional configuration having tapering side portions 33 and 34 and is provided with a longitudinally extending T-slot 35 which extends substantially parallel with the lower surface 35' of the bumper. The bumper 31 may be composed of natural rubber or synthetic rubber and is characterized by its ability to be yieldably compressed when engaged by the upper control arm 16 during operation of the vehicle suspension. The bumper 31 is preferably extruded since no bonding operation of the bumper to a backing material of metal is required. The bumper may be first extruded in the cross sectional form as shown in Fig. 3 and thereafter placed in an oven for curing.

The sides 36 of the T-slot 35 receives a portion of a bumper strap 37. The strap 37 is provided with a substantially straight section 38 which is disposed within the side 36 of the T-slot 35 and is provided at one end with a hook portion 39. The hook portion 39 bends away from the straight portion 38 of the strap at approximately a 35° angle to form the hook. The rounded portion 13 of the side rail adjacent the flat portion 30 is provided with a slot 40 which receives the hook portion 39 of the strap 37 so that the hook portion interlocks with the inner surface of the rounded portion 13 adjacent the periphery of the slot 40. The other end 41 of the strap 37 depends downwardly, as shown in the drawings, and then outwardly and is provided with an opening 42 which receives a self-tapping screw 43. The screw 43 extends through the end portion 41 of the strap and self-taps into the lower part of the rounded portion 13 of the side rail as at 44. Although I have shown a self-tapping screw, which is preferred for speedy and secure assembly, any other type of means may be used at this point to securely fix the end 41 of the strap to the side rail within the broader aspects of my invention.

By utilizing my improved structure it may be readily seen that the bumper assembly 32 may be preassembled before attachment to the vehicle. After it has been assembled all that need be done is to merely insert the hook portion 39 of the bumper assembly into the slot 40 and thereafter move the assembly downwardly about the slot until the lower surface 35' of the bumper 31 engages the section 30 of the side rail. Thereafter the self-tapping screw 43 is threaded into the opening 44 in the rounded portion 13 of the side rail. In this manner, the hook portion 39 is prevented from being removed through the slot 40 since the width of the slot accommodates only the width of the strap and the height of the slot 40 accommodates only slightly more than the thickness of the strap. As may be clearly seen in the drawings, the lower portion of the bumper 31 between the cross portion 36 of the T-slot 35 and the lower surface of the bumper is compressed by the strap against the surface 30 of the side rail. It may also be seen that the leg portion of the T-slot 35 facilitates the entry of the strap into the sides 36 of the T-slot. The portions of the bumper adjacent the leg of the T-slot may be conveniently pulled outwardly to enlarge the sides 36 to thereby accommodate a speedy assembly of the unit.

While I have illustrated and described but one embodiment of my invention, it is to be understood that such is for the purpose of illustration only, and it is contemplated that those skilled in the art may modify certain details without departing from the spirit or scope of the invention as defined in the claims appended hereto.

I claim:

1. In combination with a vehicle having a suspension system and a frame structure provided with an opening therein, a bumper assembly comprising a yieldable rubber-like bumper for limiting movement of portions of said suspension system and having a longitudinally extending slot therein, a substantially rigid strap extending through said bumper and having one end portion extending through said opening for interlocking engagement with said frame structure, and means rigidly securing the other end of said strap to said frame structure.

2. In a vehicle including a frame structure having an opening therein, a bumper assembly comprising a yieldable rubber-like bumper having a slot therein adjacent one end, a substantially rigid strap having a portion extending through said slot and having one end extending through said opening and bent for interlocking engagement with said frame structure, said strap urging said adjacent one end of said bumper against said frame structure, and means rigidly securing the other end of said strap to said frame structure.

3. In a vehicle including a frame structure having an opening, a road wheel and suspension means pivotally connected therebetween and having an arm movable about said frame structure in response to rising and falling of said wheel; a bumper assembly mounted on said frame structure and adapted to engage said arm and resist movement thereof in one direction comprising a yieldable rubber-like bumper having a slot therein, a substantially rigid strap having a portion disposed within said slot and having one end thereof hooked through said opening and in interlocking engagement with said frame structure, and means for rigidly securing the other end of said strap to said frame structure to thereby urge said bumper against said structure.

4. In combination with a member having an opening therein, a bumper assembly comprising a yieldable rubber-like bumper having a slot therein adjacent a surface of said bumper, a substantially rigid strap having a portion disposed within said slot and having an end thereof receivable within said opening for interlocking engagement with said member, and fastening means for rigidly securing the other end of said strap to said member.

5. In a vehicle having a frame structure with a slot therein, a bumper assembly comprising a yieldable rubber-like bumper having a T-slot therein adjacent a surface of said bumper, a substantially rigid strap having a portion disposed in the sides of said T-slot and having an end extending through the slot in said frame structure for interlocking engagement with said frame structure, and means for rigidly securing said other end of said strap to said frame structure.

6. In combination with a vehicle having a suspension system and a frame structure provided with an opening therein, a bumper assembly comprising a yieldable rubber-like bumper for limiting movement of portions of said suspension system, a substantially rigid strap carrying said bumper and having one end portion extending through said opening for interlocking engagement with said frame structure, and means rigidly securing the other end of said strap to said frame structure.

7. In combination with a vehicle having a suspension system and a frame structure provided with an opening therein, a bumper assembly comprising a yieldable rubber-like bumper for limiting movement of portions of said suspension system, a substantially rigid strap carrying said bumper and having one end portion extending through said opening for interlocking engagement with said frame structure, and a self-tapping fastener securing the other end of said strap to said frame structure.

References Cited in the file of this patent

UNITED STATES PATENTS

| Number | Name | Date |
| --- | --- | --- |
| 1,588,578 | Hersey | June 15, 1926 |
| 2,104,687 | Zahm | Jan. 4, 1938 |
| 2,173,667 | Slack | Sept. 19, 1939 |
| 2,517,611 | Utz | Aug. 8, 1950 |

FOREIGN PATENTS

| Number | Country | Date |
| --- | --- | --- |
| 339,891 | France | Apr. 28, 1904 |